(12) United States Patent
Bulmer (10) Patent No.: US 11,684,036 B2
(45) Date of Patent: Jun. 27, 2023

(54) LIVESTOCK FEEDING DEVICE

(71) Applicant: Matthew Bulmer, Puslinch (CA)

(72) Inventor: Matthew Bulmer, Puslinch (CA)

(*) Notice: Subject to any disclaimer, the term of this patent is extended or adjusted under 35 U.S.C. 154(b) by 419 days.

(21) Appl. No.: 16/855,869

(22) Filed: Apr. 22, 2020

(65) Prior Publication Data

US 2020/0329668 A1    Oct. 22, 2020

Related U.S. Application Data

(60) Provisional application No. 62/836,826, filed on Apr. 22, 2019.

(51) Int. Cl.
*A01K 5/02* (2006.01)

(52) U.S. Cl.
CPC .................. *A01K 5/0225* (2013.01)

(58) Field of Classification Search
CPC .......... A01K 5/0225; A01K 5/02; A01K 1/10; A01K 1/105
See application file for complete search history.

(56) References Cited

U.S. PATENT DOCUMENTS

| | | | | |
|---|---|---|---|---|
| 2,830,558 | A * | 4/1958 | St Pierre ................. | A01K 5/01 119/58 |
| 5,355,834 | A * | 10/1994 | Blazek ................. | A01K 1/0029 256/10 |
| 5,586,519 | A * | 12/1996 | Wilkinson ............... | A01K 5/01 119/60 |
| 6,006,696 | A * | 12/1999 | Mann ...................... | A01K 1/10 119/60 |
| 6,273,024 | B1 * | 8/2001 | Windholz .............. | A01K 1/105 119/60 |
| 9,374,980 | B1 * | 6/2016 | Schwenke .............. | A01K 1/105 |
| 2016/0044893 | A1 * | 2/2016 | Jubinville ................ | A01K 5/02 119/60 |
| 2018/0332819 | A1 * | 11/2018 | Michalec ............. | A01K 5/0291 |
| 2018/0343828 | A1 * | 12/2018 | Lunaas ................ | A01K 5/0225 |

* cited by examiner

*Primary Examiner* — Ebony E Evans
(74) *Attorney, Agent, or Firm* — David J. Schnurr (57) ABSTRACT

The subject livestock feeding device consists of a body member and a flexible feed rate control member to optimize the feeding rate of hay through the top of the body member. The flexible feed rate control member conforms to the volume and shape of the hay within the device providing a simulated-natural feeding environment for horses to nibble hay. The flexible feed rate control member is operationally retractable to quickly facilitate top loading of hay into the body member.

20 Claims, 4 Drawing Sheets

LIVESTOCK FEEDING DEVICE

TECHNICAL FIELD

The present invention is directed to animal feeders, and more particularly to hay feeders for horses.

BACKGROUND

A normal horse consumes approximately two to three percent of its own body weight in the form of dry weight equivalent of feed each day. In nature, horses graze on grasses for up to 20 hours per day and their digestive systems evolved to process small amounts of forage slowly over a long period of time. Horses use their lips and front teeth to select small amounts of grass, and they are calmed by the work of nibbling their forage. Horses are very particular about their forage and will not eat it if is soiled.

Most domesticated horses or similar grazing animals do not have access to natural pasture grazing throughout the year. This can be due to having limited land available for pasture or due to weather conditions that do not permit pasture feeding. The common food choice to compensate for the lack of pasture is baled dry hay.

When a meal-sized portion of dry hay is loosely spread on the ground, it is consumed too quickly often leaving horses with no forage in between their feedings. In addition, loose hay is wasted either as a result of being soiled with manure or urine from the livestock, trampled into the ground or simply blown by the wind out of the animals' enclosure.

SUMMARY OF PARTICULAR EMBODIMENTS

It will be appreciated by those skilled in the art that other variations of the embodiments described below may also be practiced without departing from the scope of the invention. Further note, these embodiments, and other embodiments of the present invention will become more fully apparent from a review of the description and claims which follow.

In one embodiment of the present invention, there is provided a livestock feeding device for:
controlling consumption rates for optimal feeding of hay to horses;
enabling herd-style grazing of several horses;
allowing feeding in a natural head-down position;
reducing waste;
enabling the user to quickly restock large quantities of hay without the need of motorized equipment; and/or
combining the cost effectiveness and feed rate control abilities of the flexible feeders with the superior capacity and durability of the large rigid body feeders.

According to one aspect of the invention, a livestock feeding device is provided. The livestock feeding device may comprise: a body member comprising: a base portion having a plurality of legs; a plurality of side wall portions extending from the base portion, the side wall portions and base portion defining an inner volume for housing livestock feed; and a top portion connected to the plurality of side wall portions; a rail connected to at least one of the plurality of side walls; and a flexible feed rate control member for metering the feeding rate of the hay, the flexible feed rate control member comprising a first edge coupled to a hanger member slidably mounted to the rail, and a second edge coupled to at least one of the plurality of side wall portions, wherein the flexible feed rate control member is configured to extend to define a portion of the inner volume between, flexible feed rate control member, the plurality of side wall portions, and the base portion, in an extended closed position, and to contract allowing unhindered access to the inner volume in an open position, wherein the flexible feed rate control member defines a plurality of holes through which hay may transit.

Other embodiments of the present invention relate to a livestock feeding device comprising a body member having a rigid base portion of sufficient size to accommodate two small square bales side by side or up to 150 pounds of baled dry hay. The base of the body member may also include two or more legs, rigid side walls which may extend to a sufficient height to accommodate the height of one small square bale of hay and high enough to discourage livestock from placing their feet inside the feeder. An inner volume of the body member is defined by the plurality of side walls portions and the base portion. A top portion may be connected to the side walls. In an embodiment, the top portion has a rolled edge to mitigate against cutting, chafing, or otherwise injuring livestock reaching into the body member during feeding. The top portion may also comprise an aperture extending through the top portion. The feeding device also comprises a flexible feed rate control member for metering the rate that hay can be eaten by livestock, the flexible feed rate control member comprising a first edge coupled to a hanger member slidably mounted to the rail, and a second edge coupled to at least one of the plurality of side wall portions. The flexible feed rate control member may be sufficiently sized to allow the feed rate control member to freely conform to an inner surface of the body member, i.e. the full height of the side walls and base portion. The flexible feed rate control member may be appended to the body member by way of a hanger member which permits the flexible feed rate control member to be operationally retractable. The hanger member may be slidably mounted on the rail.

In one embodiment of the present invention, the flexible feed rate control member may be configured to extend to define a portion of the inner volume between the flexible feed rate control member, the plurality of side wall portions, and the base portion, in an extended closed position, and to contract allowing unhindered access to the inner volume. The flexible feed rate control member may define a plurality of holes through which livestock feed (e.g. hay) may transit. For example, flexible feed rate control member may hinder access to hay within the body member to slow the rate a horse will eat the hay.

The inner volume defined between the side walls, the base portion and the flexible feed rate control member may receive feed, e.g. hay for feeding livestock, when the flexible feed rate control member is retracted and provides controlled rate feeding of the hay by livestock when not retracted. The design of the present invention prevents livestock from soiling the hay, limits the dispersal of the hay, prevents the hay from contacting the ground, controls the consumption of the hay from the feeder and simulates grazing by allowing the livestock to consume the hay in a natural heads down position.

The livestock feeding device is not limited to comprising a single rail or hanger member. In an embodiment, a first hanger member and a second hanger member are each slidably coupled to one or more rails, and a flexible feed rate control member for metering the feeding rate of the hay is provided. The flexible feed rate control member may have a first edge coupled to the first hanger member, and a second edge coupled to the second hanger member.

Multiple hanger members, which are each slidable along one or more rails allow each hanger member to move independently of each other, and permit the flexible feed rate control member to be extended or contracted by moving either the first or second hanger members.

As used herein, "hay" may refer to all types of hay, including, but not limited to, forages such as Bermuda grass, timothy, orchard, brohme, alfalfa and the like.

The foregoing and other features and advantages of the present invention will be apparent from the following more detailed description of the particular embodiments of the invention, as illustrated in the accompanying drawings.

BRIEF DESCRIPTION OF THE DRAWINGS

In the drawings, preferred embodiments of the invention are illustrated by way of example. It is to be expressly understood that the drawings are only for the purpose of illustration and as an aid to understanding and are not intended as a definition of the limits of the invention. The embodiments herein will be understood from the following description with reference to the drawings, in which.

DETAILED DESCRIPTION OF EXAMPLE EMBODIMENTS

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. In particular, all terms used herein are used in accordance with their ordinary meanings unless the context or definition clearly indicates otherwise. Also, unless indicated otherwise except within the claims the use of "or" includes "and" and vice-versa. Non-limiting terms are not to be construed as limiting unless expressly stated or the context clearly indicates otherwise (for example, "including", "having", "characterized by" and "comprising" typically indicate "including without limitation"). Singular forms included in the claims such as "a", "an" and "the" include the plural reference unless expressly stated or the context clearly indicates otherwise. Further, the stated features and/or configurations or embodiments thereof the suggested intent may be applied as seen fit to certain operating conditions or environments by one experienced in the field of art. Reference in this specification to the term "about" or "approximately" means an acceptable deviation from a specific value, as defined by the average person skilled in the art, which partly depends on how the value is measured or determined. Reference in this specification to the term "substantially" means that an action, feature, characteristic, state, structure, item, or result has a complete or near-complete extent.

As shown in FIGS. 1-4, the feeding device (100) comprises a body member (1) comprising a base portion (2), a plurality of legs (3), a plurality of side wall portions (4) extending from the base portion, the side wall portions and base portion defining an inner volume to contain livestock feed. The side wall portion may be of sufficient height to discourage livestock from stepping in the device and may be connected to a top portion (5) with rounded edges to mitigate chafing or cutting livestock that is reaching into the body member (1). The top portion (5) may also define an aperture (6) that extends through the top portion. The aperture (6) may communicate with the inner volume to permit a livestock feed to be fed through the aperture (6) and into the inner volume.

Feeding device (100) also comprises a flexible feed rate control member (7) to meter the rate that hay can be eaten by livestock. The flexible feed rate control member (7) may comprise a first edge (13) coupled to a hanger member (10) slidably mounted to a rail (8), and a second edge (14) coupled to a fixed point from which hanger member (10) may oscillate its position, e.g. at least one of the plurality of side wall portions.

In one embodiment, rail (8) may be U-shaped, having a first and second parallel portions and a third portion that connects the first and second portions. First edge (13) of the flexible feed rate control member (7) may be coupled to hanger member (10) which is slidably mounted on the two parallel portions (i.e. the first and second portions) of the U-shaped rail, and the second edge (14) of the flexible feed rate control member (7) is coupled to the third portion of the U-shaped rail that joins the two parallel portions of the U-shaped rail. The flexible feed rate control member (7) may be configured to extend to define a portion of the inner volume between the flexible feed rate control member (7), the plurality of side wall portions, and the base portion, in an extended closed position, and to contract allowing unhindered access to the inner volume.

Alternatively, the rail (8) need not be U-shaped, and each section of the rail need not be connected. For example, two substantially parallel stationary side rails may positioned on opposite sides of the device (100), and a third stationary rail may be positioned substantially perpendicular to each of the two side rails at a third side of the device (100) perpendicular to the sides on which the side rails are positioned.

In one embodiment, in order to enable maximum freedom of movement of the feed rate control member (7) along each side of the device (100), the rails (8) may be attached to or otherwise, in contact with the body (1) of the feeder device (100) at or near the ends of each hanger member (or at a latching point near the ends of each rail (8)). This may be achieved by allowing the ends of each rail (8) to pass through the body member (1) (or in the case of a rail 8) that is shaped to continuously extend within a corner (e.g. a hanger rod having an at least one bend) by placing fasteners such as U-bolts as close to the corner (or bend) as possible). By fastening the stationary rails (8) to the body (1) instead of positioning the rails on a floating frame, lateral movement of the feed rate control member (7) is permitted along each side of the feeder device (100), and further permits the use of a hanging member (10) that does not need to be removed from the device in order to reload feed into the device (100).

Figure 1:
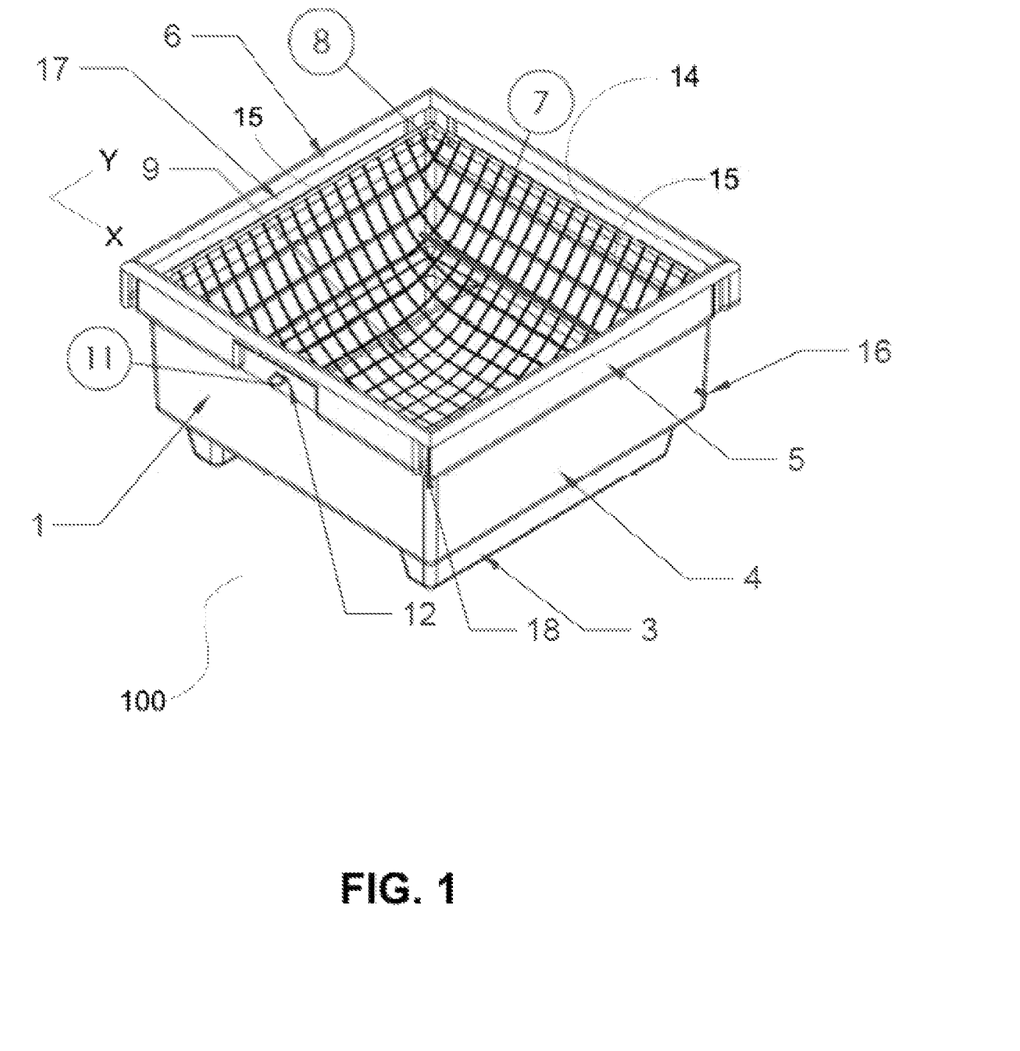
FIG. 1 is a perspective view of an embodiment of the livestock feeding device with the flexible feed control component in the extended closed position.

In the embodiment shown in FIG. 1, it can be seen that the side rails (8) which run perpendicular to the slidable hanger member (10) are positioned within the device (100) such that each side rail (8) extends into a receiver portion contained at each end of the body member (1), such that each end of the side rails (8) extends into a receiver portion of the body member (1). The rear rail (8) which is positioned on the end of the body member (1) opposite the sliding hanger member (10) and perpendicular to the side rails (8) may be secured to the body member (1) in an equivalent manner.

Flexible feed rate control member (7) partially restricts livestock access to livestock feed, e.g. hay, placed within the inner volume of the feeding device (100). In an embodiment, flexible feed rate control member is a net defining a plurality of holes through which hay may transit. As described herein, transiting of hay through the flexible feed rate control member (7) relates to livestock physically biting, licking, or otherwise grabbing the hay and pulling it through the flexible feed rate control member (7). The flexible feed rate control member (7) may be composed of Polyamide (e.g. Nylon™), polyester, polyethylene, or other suitable material.

In one embodiment, the flexible feed rate control member (7) is a continuous piece of netting and is sufficiently sized to allow the feed rate control member (7) to conform freely along the internal surface area of the body member (i.e. the area of the height of the side walls (4) and area of the base portion (2)). As such, the flexible feed rate control member (7) is permitted to self adjust to the inner volume as the amount of hay decreases or the shape of the hay within the inner volume changes. Use of a continuous feed rate control member (7) (e.g. continuous netting) permits freer movement of the netting in order to reduce material fatigue on the feed rate control member (7). In addition, use of a continuous feed rate control member (7) simplifies assembly of the device (100) and permits enhanced control of the feed rate control member (7) by a human user, and further minimizes the potential that the feed rate control member (7) could contact the ground when filling the device (100) with feed. In one embodiment, in order to reduce the amount of netting that is continuously bunched up on top of the hay (or other feed) and to reduce the risk of accidental openings within the netting, continuous sheets of netting without unnecessary openings that need to be closed with a drawstring or similar action can be employed. This improves the ability of the net to conform to a reducing volume of hay (or other feed) and also improves the horses' ability to access the hay (or other feed) evenly across the feeder device (100).

In order to facilitate effective operation of the feeder device (100), in one embodiment, the flexible feed rate control member (e.g. netting) (7) is sized to cover the inner surfaces of the body member (1) below any hanger members (10) located near the top (5) of the feeder device (100), while simultaneously limiting the amount of netting that can bunch up on top of the hay when the device (100) is loaded or reloaded. At the same time, safe use of the feeder device (100) may require that the amount of netting that can drape down the outside of the feeder device (100) is minimized. In one embodiment of the present invention, by virtue of the unique positioning of hanger members (10) within the device (100) combined with the use of a net minder member (16), the amount of netting that can bunch up on top of freshly loaded hay is reduced, and further, the amount of netting that can drape over the outside of the feeder device (100) is limited. In one embodiment, these beneficial effects can be achieved by mounting the rail(s) (8) and hanger member (10) up to approximately 6 inches below the top of the feeder device (100) in combination with the placement of a net minder member (16) inside the body member (1).

In one embodiment, the net minder (16) is composed of a rigid elongate member which spans substantially from one side of the body member (1) to a parallel side of the body member (1) such that the net minder (16) is positioned perpendicularly (or substantially perpendicularly) to these sides of the body member (1). The net minder (16) may be affixed to the body member (1) and may be affixed to the body member (1) using conventional fasteners. In one embodiment, the net minder (16) is installed approximately less than half way up one side of the feeder device (100) and parallel (or substantially parallel) to the moveable (or slidable) hanger member (10) (which could be positioned at or near the top of the body member (1))—for example, when the slidable hanger member (10) is in its resting position with the feed rate control member (7) withdrawn and the aperture (6) exposed.

In one embodiment, the net minder member (16) is passed through the openings of the flexible feed rate control member (e.g. netting) (7) in a manner similar to the upper hanger members (10). This arrangement forces the netting down to the net minder member (16) and then back up again on one side of the feeder device (100) before passing over the freshly loaded hay (or other feed), thereby reducing the amount of netting that can bunch up on top of the hay or that can be draped over the exterior side of the feeder device (100). When the slidable hanger member (10) is in a closed position, such that the feed rate control member (7) is positioned over the aperture (6) of the device (100), the amount of netting that can drape over the exterior side of the body member (1) is limited. For example, in one embodiment, the amount of netting that can drape over the exterior side of the body member (1) is limited to the top of the feeder device (100) equal to approximately sixty percent of the overall height of the body member (1), or to a point up from the bottom (9) of the body member (1) no less than approximately forty percent of the height of the body member (1). However, as the amount of hay remaining in the feeder device (100) is reduced, the limiting effect of the net minder member (16) is reduced until the level of the remaining hay is below the level of the net minder (16) at which point the net minder member (16) does not limit the ability of the feed rate control member (e.g. netting) (7) to reach the bottom (9) of the feeder device (100).

In order to prevent an animal from bypassing the feed rate control member (7) to access the animal feed by positioning its mouth between the rails (8) and the body member (1), in one embodiment, the gap or body gap (17) between the rails (8) and the body member (1) does not exceed approximately 1.25 inches.

The flexible feed rate control member (7) may be appended to the body member (1) by way of hanger member (s) (10) that are mounted on a rail (8) which permits the flexible feed rate control member (7) to be retractable to an open position (shown in FIG. 2) allowing unrestricted access to the inner volume. Flexible feed rate control member (7) may also be extended to a closed position (shown in FIG. 1) to define a portion of the inner volume between the flexible feed rate control member (7), side walls (4), and base portion (2), where livestock feed may only be accessed through the flexible feed rate control member. One or more rails (8) is/are provided to permit hanger member(s) (10) to be slidably mounted thereon to permit the flexible feed rate control member (7) to be extended or contracted between the open and closed positions.

In one embodiment, flexible feed rate control member (7) may be coupled to the rail (8). The flexible feed rate control member (7) may be slidably coupled to rail (8), including, for example, by use ring shaped fasteners (not shown). Permitting the flexible feed rate control member (7) to be slidably and rotationally engaged with the rail (8) minimizes material fatigue and excessive wear of the flexible feed rate control member (7) caused by abrasion and or material fatigue created when the hanger member (10) moves the flexible feed rate control member (7) from its extended to contracted state, or vice versa, or as the livestock transit hay through the flexible feed rate control member (7).

Inner volume may receive hay for feeding livestock through the aperture (6) in the top portion (5) of the body member (1) when the flexible feed rate control member (7) is retracted and may provide controlled rate feeding of the hay by livestock through the aperture (6) in the top of the body member (1) when not retracted.

Figure 2:
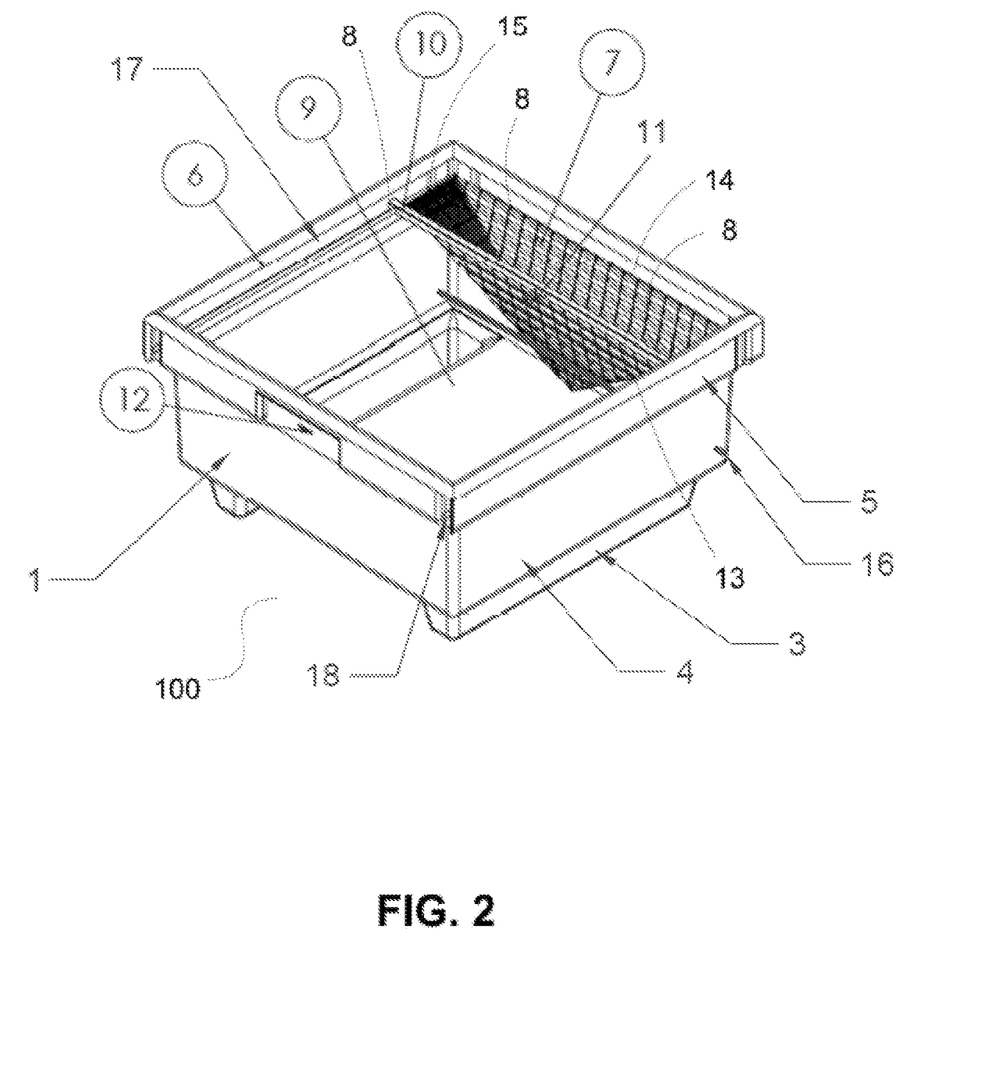
FIG. 2 is a perspective view of the feeding device of FIG. 1 with the flexible feed component in the retracted open position.
Figure 3:
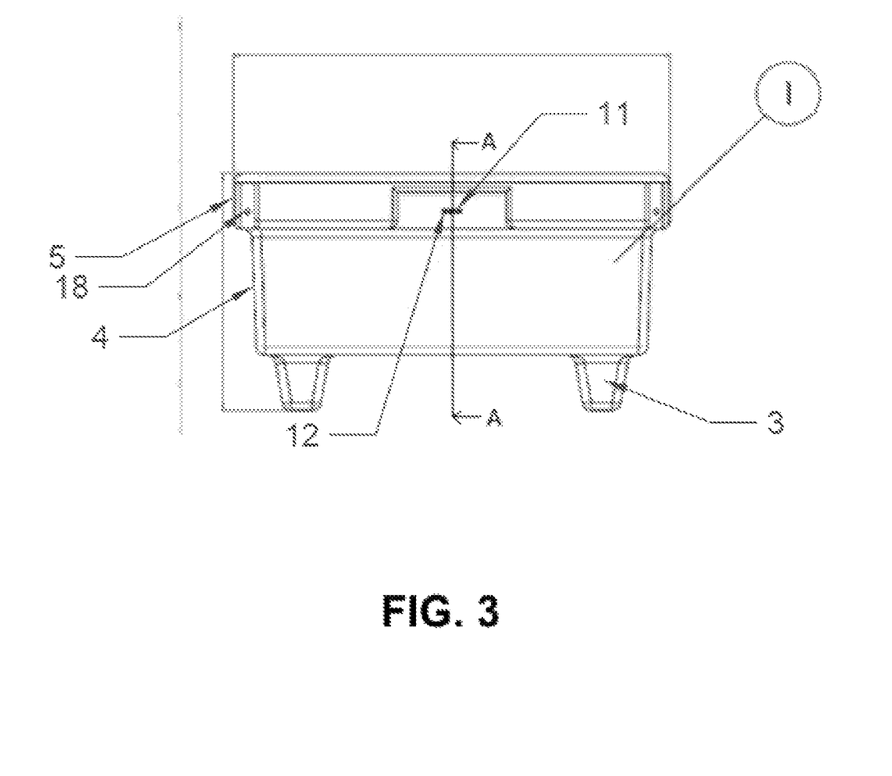
FIG. 3 is a front elevation view of the feeding device of FIG. 1.
Figure 4:
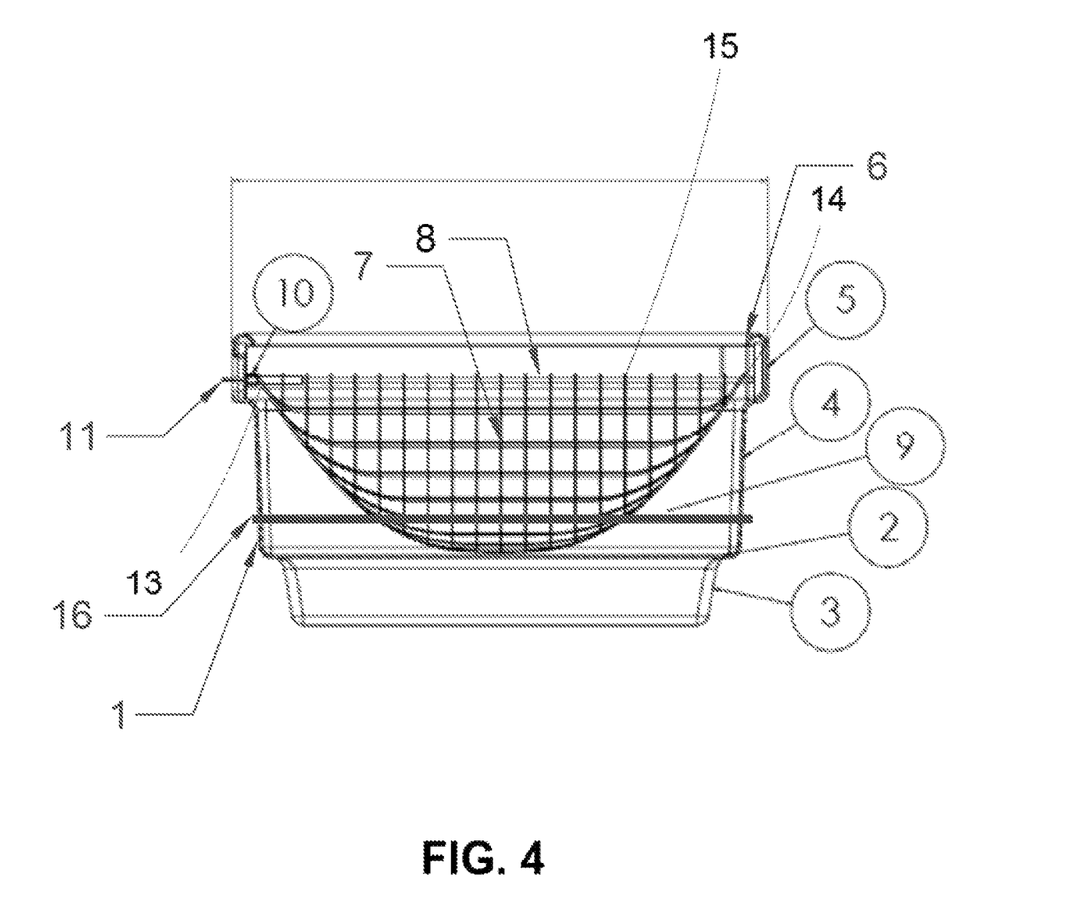
FIG. 4 is a cross sectional along the line A-A of the feeding device depicted in FIG. 3.

Loading of livestock feed, e.g. hay, into the inner volume is facilitated by sliding the movable hanger member (10) along the rails (8) from the closed position as shown in FIG. 1 to the open position as shown in FIG. 2 which retracts the flexible feed rate control member (7) providing unobstructed access to the inner volume.

Upon placing the desired amount of hay within the body member (1) the hanger member (10) may returned to the closed position as shown in FIG. 1 thereby drawing the flexible feed rate control member (7) over the newly loaded hay and preventing livestock from having direct access to the hay. For greater security, the hanger member (10) can be secured in the closed position by attaching locking member (not shown), e.g. a clasp, to the latching loop (11) on the hanger member (10) that is configured to pass through a slot (12) defined by a side wall portion (4) or top portion (5) of the body member (1) when the hanger member (10) is in the closed position as shown in FIG. 1.

Each lateral edge (15) of the flexible feed rate control member (7) may be coupled to a rail(s) (8) mounted to a side wall portion of the body member (1). Flexible feed rate control member (7) may be coupled to a rail (8) by a plurality of fasteners (not shown) along each lateral edge (15) of the flexible feed rate control member (7) where the fasteners permit the flexible feed rate control member to slide along rail (8). Fasteners permit flexible feed rate control member to slide on rail (8) for extension and retraction. In an embodiment, flexible feed rate control member (7) may be coupled to rail (8), wherein flexible feed rate control member (7) may be slidably coupled to rail (8), by ring shaped fasteners (not shown). Permitting the flexible feed rate control member to be slidably and rotationally coupled to the rail (8) minimizes material fatigue and excessive wear of the flexible feed rate control members (7) caused by abrasion and or material fatigue created when the hanger member moves the flexible feed rate control member from its extended to contracted state, or vice versa, or as the livestock transit hay through the flexible feed rate control member.

As shown in FIGS. 1 and 2, top portion 5 defines an opening to body member 1 in a first plane X-Y and the opposing rails extend in a second plane parallel to the first plane. As depicted, opposing rails (8) may be coplanar and mounted to opposing sidewalls 4. A first edge (or proximate edge) may be coupled to hanger member 10 for extension and contraction with the hanger member 10 as it slides on rails (8). Second edge (14) of the flexible feed rate control member (7) may be coupled to a fixed point from which hanger member (10) may oscillate its position. For example, second edge (14) may be coupled to one of the side wall portions (4) from which hanger member (10) extends from (shown in FIGS. 1 and 4) or contracts to (shown in FIG. 2). Second edge (14) may be coupled to a sidewall portion (4) directly or indirectly with another component.

Rail(s) (8) may be appended to the body member (1) in a manner that permits the flexible feed rate control member (7) to hang down into the inner volume and to slide along their length to facilitate opening and closing of the flexible feed rate control member (7).

The fastening of the flexible feed rate control member (7) to rail(s) (8) within the body member (1) may prevent the flexible feed rate control member (7) from being removed from the device (100), which would otherwise create an entanglement hazard for livestock.

By appending the flexible feed rate control member (7) to rails (8) which may be mounted directly adjacent to, or in close proximity to, to the side portions (4) of the body member (1), the flexible feed rate control member (7) may be operable to prevent access to the hay around the inner perimeter of the body member (1). In one embodiment, the flexible feed rate control member (7) is engaged to the rails (8), which rails (8) may be mounted to the body member (1) in a manner to maintain a rail (8) to body gap (17) of less than or equal to approximately 1.25 inches to, the top portion (5) of the body member (1). In this way, the device (100) is operable to prevent an animal from bypassing the feed rate control member (7) in order to access feed in the vicinity of the inner perimeter of the body member (1).

Further, rails (8) may be configured to mount flexible feed rate control members that may define a plurality of foraging apertures of various shapes and sizes. For example, the foraging apertures may be circular, diamond, oval, round triangle, square, combination of geometric shapes, or any other geometric shape. In an embodiment, the shapes of the foraging aperture in flexible feed rate control member (7) may be made from various sizes of rope tied, knotted or woven into netting, or flat webbing tied, woven or stitched into the form of a net. These types of flexible feed rate control members eliminate the issues of cracking associated with prior art devices that utilize a rigid consumption restriction plate.

The plurality of foraging apertures may extend through the flexible feed rate control member (7). The foraging apertures control the amount of hay that can be eaten through the flexible feed rate control member (7). The foraging apertures may be evenly spaced to ensure that the hay is evenly accessed by the livestock.

In an embodiment, the foraging apertures may be of any size, for example the foraging aperture may have a perimeter of 1 to 6 inches. Smaller apertures, e.g. having a perimeter of 1-4 inches, may be used to maximize foraging time for horses that are overweight or require more oral stimulation.

In some embodiments, the device (100) may not include a hanger member (10) or a rail (8). While the device (100) is shown in FIGS. 1-4 as including at least one hanger member (10) and at least one rail (8), other embodiments are contemplated where the hanger member and rail (8) are optional. For example, flexible feed rate control member (7) may be mounted directly to the side walls (4) along the perimeter of body member (1), wherein each of the edges of the flexible feed rate control member (7) are fixed in position and are not movable. In this example, access to the inner volume of the device (100) is through a side or bottom panel in side walls (4) or base portion (2) respectively or by the removal or hinging of the upper portion of the body member (1).

In some embodiments, loading the inner volume of the device (100) with feed may be achieved through alternative means of loading through the aperture (6). While the device (100) is shown in FIGS. 1-4 as facilitating loading of the inner volume (100) from the top by way of movable hanger member (10), other embodiments are contemplated. For example, device (100) may not include a movable hanger member (10) such that flexible feed rate control member (7) may hang from rails (8) mounted about the internal perimeter of the side walls (4) of body member (1), wherein none of the rails (8) are movable. As a result, loading of the inner volume with hay may be achieved by the hinging of the hanger members (8).

In other embodiments, the device (100) may include more than one hanger member (10). While the device (100) depicted in FIGS. 1-4 shows only one movable hanger member (10) other embodiments having a plurality of hanger members (10) are contemplated. For example, device (100) may include a second hanger member (not shown), where each of the first and second hanger members are slidably mounted to one or more rails (8). A second flexible feed rate control member may be coupled to the second hanger member and be configured to define a portion of the inner volume in an extended position between sidewall (4), base portion (2), and flexible feed rate control member (7). The second flexible feed rate control member may comprise a first edge coupled to the second hanger member that is slidably mounted to a second rail connected to one of the plurality of side walls. A second edge of the second flexible feed rate control member may be coupled to at least one of the plurality of side wall portions. Each of the first and second hanger members separately coupled to the first and second flexible feed rate control members, may be moved independently from an extended closed position to a contracted open position, to provide access to the inner volume.

Hanger member (10) may be secured in the closed position by attaching a clasp to a loop (11) on the hanger member (10) that is configured to pass through a slot (12) in a side wall portion (4), or top portion (5), of the body member (1). While the device (100) is shown as including the movable member (10) that can be secured in the closed position by attaching a clasp to a loop as described above, other embodiments may include the hanger member (10) being securable in the closed position through the use of friction, magnetism or other mechanical means of securing the movable member (10) in the closed position.

In some embodiments, loading of the inner volume may be achieved through alternative means rather than loading through the aperture (6). While the device is shown in FIGS. 1-4 as facilitating loading of the inner volume from the top, other embodiments have been contemplated. For example, device (100) may not include hanger member 10 such that flexible feed rate control member (7) may hang from rails (8) mounted about the internal perimeter of the side walls (4) of body member (1), wherein none of the rails (8) are movable. As a result, loading of the inner volume with hay may be achieved through an opening (not shown) in a side wall portion (4) or base portion (2) of the body member (1) or by the removal or hinging of the upper portion of the body member (1).

As shown in FIGS. 1-4, rails (8) may be connected to the inside of the body member (1). In other embodiments, rails (8) may be mounted outside of the body member (1) to an exterior surface of the side walls (4) or top portion (5). In an embodiment, hanger members (10) may be made from a rigid material. However, rails (8) are not limited to rigid materials and may be flexible material such as rope, wire rope, or the like.

As shown in the embodiment of FIGS. 1 and 2, body member (1) may have a generally square shaped cross section when review from above, and a generally cubic dimensions. However, in other embodiments, body member (1) is not limited to having a generally square shaped cross section. In an example, body member (1) may have a rectangular cross section when viewed from above. The cross sectional area of body member (1), i.e. the footprint, may vary in size. For example, body member may be sized accommodate two small square bales placed side-by-side, or may be sized to house one small square bale within the body member (1). In further embodiments, body member (1) may have a cubic or square shape to accommodate two small square bales side-by-side but may have side walls (4) having a height to accommodate two bales on top of each other. In other embodiments the body member (1) may have a triangular exterior shape to facilitate mounting in the corner of a stall or building.

As shown in FIGS. 1 and 2, top portion (5) comprises exposed edges that are rolled edges in order to protect feeding livestock. The lack of sharp edges reduces the likelihood for the livestock to be injured during feeding. In addition, in one embodiment, the entirety of the body member (1), or alternatively, the side wall (4) and/or base portion (2) may be tapered in the direction of the lower section of the body member (1) (or side wall (4) and/or base portion (2)) in order to facilitate a comfortable feeding position for the horses using the device (100) while minimizing neck strain. In addition, a tapered configuration of the device (100) wherein the area defined by the aperture 6 is greater than the area of defined by a lower floor of the base portion permits an animal to access all of the feed contained in the device (100), including feed contained in and around each corner of the device (100). In one embodiment, the minimum rise and run of the taper (or bevel) is approximately 1.5 inches.

The device (100) may be formed from a variety of different types of materials or combinations thereof that can readily be formed into shaped objects provided that they are suitable for a livestock feeding device. Example materials may include wood, rubbers (synthetic and/or natural) and/or other like materials; glasses (such as fiberglass) carbon-fiber, aramid-fiber, any combination thereof, and/or other like materials; polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; composites and/or other like materials; metals, such as zinc, magnesium, titanium, copper, iron, steel, carbon steel, alloy steel, tool steel, stainless steel, aluminum, any combination thereof, and/or other like materials; alloys, such as aluminum alloy, titanium alloy, magnesium alloy, copper alloy, any combination thereof, and/or other like materials; any other suitable material; and/or any combination thereof.

The elements of device (100) may be manufactured separately and then assembled together. However, some or all of the elements of device (100) may be integrally joined with one another. Manufacture of the elements separately or simultaneously may involve rotomolding, extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the elements are manufactured separately, they may then be coupled with one another in any manner, such as with adhesive, a weld, a fastener (e.g. a bolt, a nut, a screw, a nail, a rivet, a pin, and/or the like), wiring, any combination thereof, and/or the like for example, depending on, among other considerations, the particular material forming the members. Other possible steps might include sand blasting, polishing, powder coating, zinc plating, anodizing, hard anodizing, and/or painting the members for example.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The invention is defined by the appended claims. The description as set forth is not intended to be exhaustive or to limit the invention to the precise form disclosed. Many modifications and variations are possible in light of the teachings above without departing from the spirit and scope of the forthcoming claims.

The claims are not intended to include, and should not be interpreted to include, means-plus- or step-plus-function limitations, unless such a limitation is explicitly recited in a given claim using the phrase(s) "means for" or "step for," respectively.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any modification, combination or permutation of any of the components, elements, functions, operations, or steps described or illustrated anywhere herein that a person having ordinary skill in the art would comprehend. All such modifications, combinations and permutations are believed to be within the sphere and scope of the invention as defined by the claims appended hereto.

I claim:

1. A livestock feeding device for holding a quantity of feed material comprising:
   a body member comprising:
     a base portion having a plurality of legs;
     a plurality of side wall portions extending from the base portion, the side wall portions and base portion defining an inner volume for housing livestock feed; and
     a top portion connected to the plurality of side wall portions;
   an at least one rail connected to at least one of the plurality of side walls; and
   a flexible feed rate control member for metering the feeding rate of the feed material, the flexible feed rate control member coupled to a hanger member slidably mounted to the at least one rail at a first edge, and a second edge coupled to at least one of the plurality of side wall portions,
   wherein the flexible feed rate control member is configured to extend over a portion of the inner volume between the, flexible feed rate control member, the plurality of side wall portions, and the base portion, in a closed position, and to contract allowing unhindered access to the inner volume in an open position.

2. The device of claim 1, wherein the flexible feed rate control member defines a plurality of holes through which feed material may transit.

3. The device of claim 1, wherein the top portion has a rolled edge.

4. The device of claim 1, wherein the top portion defines the opening in a first plane X-Y and the at least one rail extends in a second plane parallel to the first plane.

5. The device of claim 1, wherein the flexible feed rate control member includes material sufficient to cover an interior surface of the body member.

6. The device of claim 1, wherein the flexible feed rate control member is configured to rest on feed material within the inner volume of the device.

7. The device of claim 1, wherein the flexible feed rate control member is sufficiently sized such that the flexible feed rate control member remains in contact with a bulk volume of feed material as the volume decreases when eaten.

8. The device of claim 1, wherein the at least one rail is connected to the side wall portions of the body member to permit the flexible feed rate control member to slide along the length of the at least one rail, the at least one rail proximate to the side wall portions to prevent livestock from accessing the inner volume of the device.

9. The device of claim 1, wherein the at least one rail is generally U-shaped, the at least one rail having a first and second parallel portions and a third portion that connects the first and second portions, and wherein the first edge is coupled to hanger member which is slidably mounted on the two parallel portions of the at least one rail, and the second edge is coupled to the third portion of the at least one rail that joins the two parallel portions of the at least one rail.

10. The device of claim 1, wherein the body member further comprises a locking member configured to maintain the flexible feed rate controller member in the extended closed position.

11. The device of claim 1, wherein the flexible feed rate control member has lateral edges each coupled to the at least one rail.

12. The device of claim 1, wherein an aperture is defined by one of the plurality of side wall portions, the aperture communicating with the inner volume to allow livestock feed to transit through the aperture.

13. The device of claim 1, wherein the rail comprises first and second side hanger members attached to the body member, each of the first and second side hanger members extending along opposite first and second sides of the body member, a rear stationary hanger member disposed perpendicular to the first and second side members and attached to the body member, the rear stationary hanger member extending along a side of the body member perpendicular to the first and second sides of the body member.

14. The device of claim 1, further comprising a net minder member disposed within an inner volume of the device, the net minder member affixed to the body member at an at least one attachment point, the net minder positioned beneath the rails, the net minder engaged with the feed rate control member in order to retain a portion of the feed rate control member within an inner volume of the device.

15. The device of claim 1, wherein the plurality of sidewalls are tapered inward toward the floor of the base portion.

16. A livestock feeding device comprising:
   a body member comprising:
     a base portion having a plurality of legs;
     a plurality of side wall portions extending from the base portion, the side wall portions and base portion defining an inner volume for housing livestock feed; and
     a top portion connected to the plurality of side wall portions;

a rail connected to at least one of the plurality of side walls; and a first hanger member and a second hanger member each slidably coupled to the rail;

a flexible feed rate control member for metering the feeding rate of the feed material, the flexible feed rate control member having a first edge coupled to the first hanger member, and a second edge coupled to the second hanger member, wherein the flexible feed rate control member is configured to extend over a portion of the inner volume between the flexible feed rate control member, the plurality of side wall portions, and the base portion, in an extended closed position, and to contract allowing unhindered access to the inner volume in an open position, wherein the flexible feed rate control member defines a plurality of holes through which feed material may transit.

17. The device of claim 16, wherein the flexible feed rate control member is slidably coupled to the rail to minimize material fatigue of the flexible feed rate control member.

18. The device of claim 13, wherein the first and second side hanger members are attached to the body member.

19. The device of claim 13, wherein the hanger members are mounted to the body member beneath a top planar surface of the device.

20. A livestock feeding device for holding a quantity of feed material comprising:

a body member comprising:

a base portion having a plurality of legs;

a plurality of side wall portions extending from the base portion, the side wall portions and base portion defining an inner volume for housing livestock feed; and a top portion connected to the plurality of side wall portions;

two fixed rails, wherein one of the two fixed rails is disposed along one side wall portion of the plurality of side wall portions, and the second of the two fixed rails is disposed along a second side wall portion of the plurality of side wall portions, such that the two fixed rails are disposed on opposing side wall portions of the plurality of side wall portions;

a movable hanger member slidably connected to the two fixed rails, such that the movable hanger member is capable of sliding along a horizontal plane between the two fixed rails; and a flexible feed rate control member for metering the feeding rate of feed material, wherein the flexible feed rate control member is slidably connected along the two fixed rails and fixedly attached to the movable hanger member, and wherein the flexible feed rate control member is configured to extend over a portion of the inner volume between the flexible feed rate control member, the plurality of side wall portions, and the base portion, in a closed position, and to contract allowing unhindered access to the inner volume in an open position.

* * * * *